2 Sheets—Sheet 1.

G. W. CHENEY.
FURNACES FOR ROASTING AND SMELTING ORES.

No. 175,928. Patented April 11, 1876.

WITNESSES.  
Ewell A. Dick  
Jno. D. Patten

INVENTOR.  
Geo. W. Cheney  
by attys Foulk & ____

2 Sheets—Sheet 2.

G. W. CHENEY.
FURNACES FOR ROASTING AND SMELTING ORES.

No. 175,928. Patented April 11, 1876.

WITNESSES. INVENTOR.

N. PETERS, PHOTO-LITHOGRAPHER, WASHINGTON, D. C.

UNITED STATES PATENT OFFICE.

GEORGE W. CHENEY, OF WASHINGTON, D. C., ASSIGNOR OF ONE-HALF HIS RIGHT TO ALBERT C. COUCH, OF PROVIDENCE, R. I.

IMPROVEMENT IN FURNACES FOR ROASTING AND SMELTING ORES.

Specification forming part of Letters Patent No. 175,928, dated April 11, 1876; application filed March 14, 1876.

*To all whom it may concern:*

Be it known that I, GEORGE W. CHENEY, of the city of Washington, in the District of Columbia, have invented certain new and useful Improvements in Furnaces for Roasting and Smelting Ores, of which the following is a specification:

My invention consists of a smelting-furnace provided with retorts or roasters, through which the heat is conducted, after passing the crucible or smelting-pot, for the purpose of roasting the ores, and also provided with a condenser, through which the draft passes before finally escaping from the chimney, the latter being for the purpose of condensing and throwing down such metals as may be passing off in a gaseous or volatile form. The roasters are situated around the flue, and open into it in greater or less number, as may be desired, and by an arrangement of dampers the heat can be passed through the roasters, or a part of them, at will, or when the roasters are not required the heat passes along the main flue without being diverted. The roasters open externally through the masonry, and are charged with ore from the outside, while the openings into the flue are so situated with reference to the crucible that the ore when roasted is discharged through the flue directly into the crucible. The condenser consists of a spray of water injected with the flue at some convenient point beyond the roasters from the fire, a basin or receptacle being provided beneath the spray, into which fall the products of the condensation and the water not evaporated. The furnace is of the reverberatory kind, the heat being deflected upon the crucible, which is situated in close proximity to the fire-box.

Figure 1:
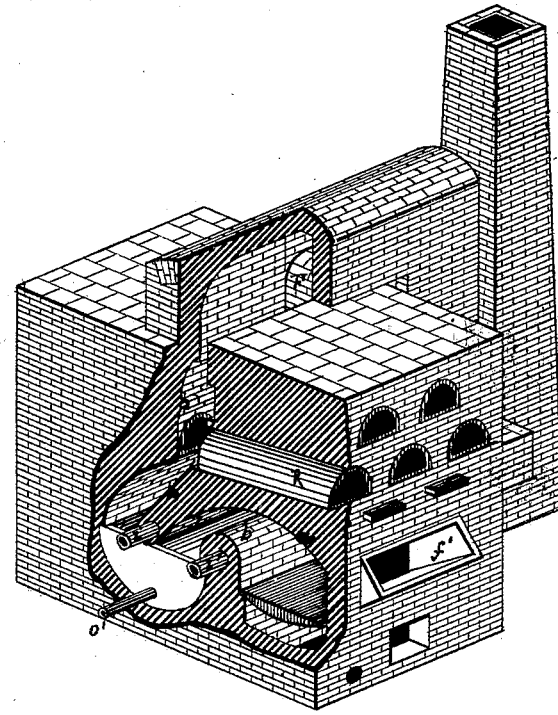
Figure 2:
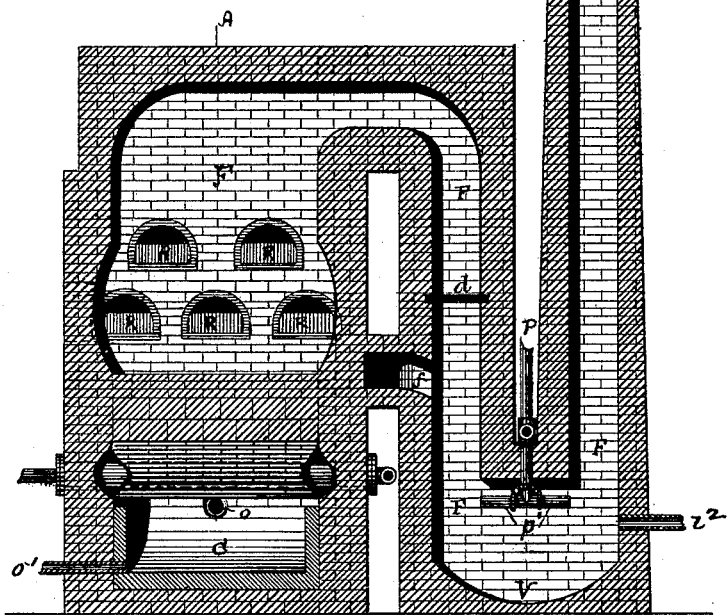
Figure 3:
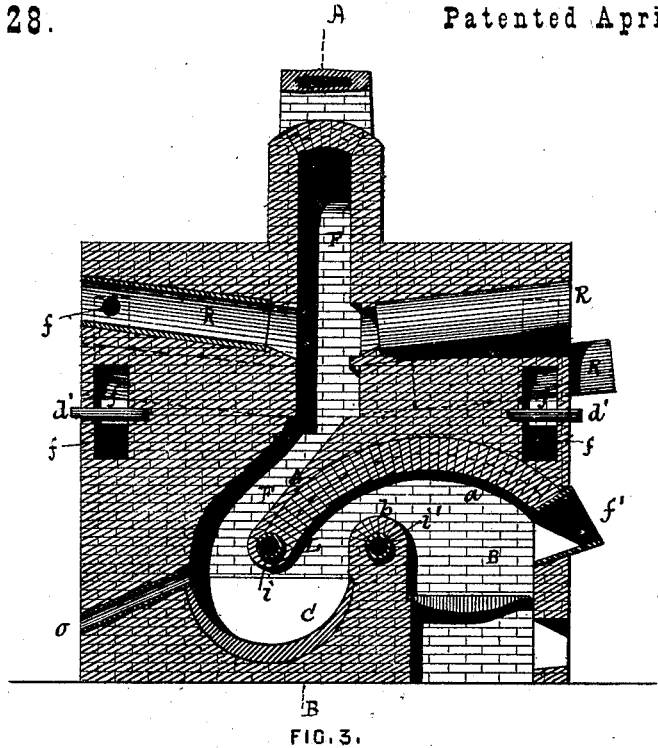
Figure 4:
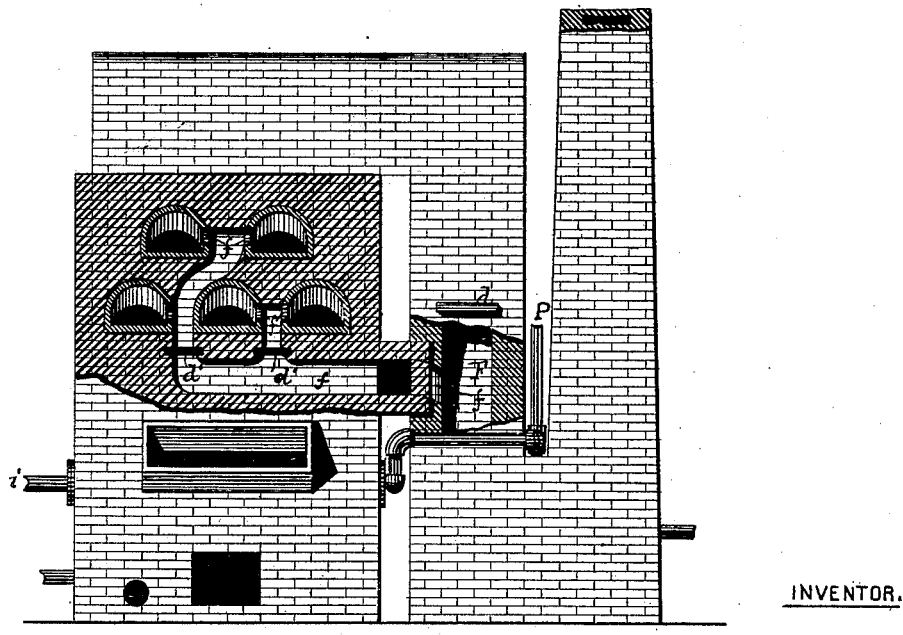

In the accompanying drawings, which are made a part of this specification, Figure 1 is a perspective view of my roasting and smelting furnace, with the side broken away to show the interior. Fig. 2 is a section on line A B, Fig. 3. Fig. 3 is a vertical section of my roasting and smelting furnace on the line A B, Fig. 2. Fig. 4 is a front elevation with a portion of the masonry broken away to show the condenser in the chimney.

W indicates the walls; B, the fire-box or furnace proper; $f'$, the fire-door; $a$, the arch, and $b$ the bridge beyond the fire, and separating it from the location of the crucible in which the ore is smelted. L is a deflector for the purpose of directing the draft upon the ore in the crucible C. Suitable openings $o$ $o'$ are for drawing off the slag and the metal. The crucible may be a vessel capable of removal for the purpose of repair, or $f$ being substituted by a new one. F is the main flue, connecting with which are the retorts or roasters R. When the roasters are to be used this flue is closed wholly or partially, as may be required, by the damper $d$. The heated current being checked is forced into the roasters, each of which is provided with a supplemental flue, $f$, so situated as to take the current after it has traversed the whole length of the roaster, and conduct it back into the main flue beyond the damper $d$. If only a portion of the roasters are to be used the remaining ones are closed by dampers $d'$ in flues $f$.

It will be seen that the roasters are simply ovens built in the masonry around the flue, through which the heat is directed by means of dampers. I prefer that the ore should be contained in retorts or trays constructed of proper material to resist destruction by heat, and adapted to slide into the ovens from the outside, a proper opening being made in each retort to correspond with the flue. This protects the masonry, and new retorts can be supplied from time to time, thus saving delays and expense in repairs. The ovens or retorts are closed externally by clay or other well-known means. For the same purpose I protect exposed points in other parts of the masonry by water contained in pipes.

In the construction of the furnace the portion of the arch which constitutes the deflector L and the apron A is supported by the pipe $i$, which pipe rests in the masonry. This pipe is supplied with water from the conducting-pipe P, with which it is connected for the purpose of diminishing the heat at the exposed point. Another pipe, $i'$, is located in the bridge $b$ for the same purpose, and also supplied with water from the same source. The roasted ore is discharged upon the apron A, from which it falls into the crucible.

The spray of water to effect the condensing of such metals as may be passing off in a gaseous or volatile form is introduced into any convenient part of the main flue beyond the point where the flues from the roasters discharge into it, and is brought from a tank, elevated to give sufficient force to the water. It is obviously advantageous to locate the tank, as well as the conducting-pipes, in such a manner as not to expose the water to unnecessary heat before it is brought in contact with the gases. P indicates the conducting-pipe, and $p'$ a section of pipe with perforations, located within the flue. The spray falls into any proper receptacle or vessel, V, which also receives the metals thrown down or condensed. A small orifice or pipe, $i^2$, discharges the water as it accumulates. The amount of metal thus saved is very considerable.

It will be seen that by the arrangement described any degree of heat within the power of the furnace to produce may be applied to the ore in the process of roasting, the same being under full control by means of the dampers described. The furnace is intended to be driven by a blast.

By this arrangement the roasters are brought in close proximity to the fire, resulting in economy of fuel, and diminishing the demands for an intense heat, which is destructive to the works; and the works can be used to advantage for either smelting or roasting separately; or both processes can go on at the same time, the surplus heat from the smelting being employed to do the roasting.

What I claim, and desire to secure by Letters Patent, is—

1. In a roasting and smelting furnace, the combination, with the crucible and main flue, of roasters located above the crucible, and assembled around and communicating with the flue, substantially as and for the purposes set forth.

2. In a roasting and smelting furnace, the combination and arrangement of the several parts described, namely, the fire-box B, crucible C, flue F, roasters R, having supplemental flues $f$, together with the dampers $d\ d'$, for the purpose of controlling, regulating, and distributing the heat, as set forth, all substantially as specified.

3. In a roasting and smelting furnace, the combination and arrangement of the crucible, the main flue, the roasters, and the apron A, for the purpose of discharging the ore from the roasters into the crucible.

4. In a structure or apparatus for roasting and smelting ores, the ovens or roasters R, having supplemental flues $f$, and operated by the surplus heat from the smelting-furnace, substantially as described.

5. In combination with the ovens R and flues F $f$, in a furnace for reducing ores, the dampers $d\ d'$, substantially as shown and set forth.

In testimony whereof I have hereunto signed my name this 13th day of March, A. D. 1875.

G. W. CHENEY.

Witnesses:
EWELL A. DICK,
HENRY R. ELLIOTT.